United States Patent
Giles et al.

(10) Patent No.: US 9,143,494 B2
(45) Date of Patent: Sep. 22, 2015

(54) METHOD AND APPARATUS FOR ACCESSING A NETWORK

(75) Inventors: Vincent Giles, Domene (FR); Samir Bouraoui, Villefontaine (FR)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 570 days.

(21) Appl. No.: 12/271,581

(22) Filed: Nov. 14, 2008

(65) Prior Publication Data

US 2009/0133109 A1 May 21, 2009

(30) Foreign Application Priority Data

Nov. 16, 2007 (EP) .................................... 07301555

(51) Int. Cl.
  *H04L 9/32* (2006.01)
  *H04L 29/06* (2006.01)
(52) U.S. Cl.
  CPC ............ *H04L 63/08* (2013.01); *H04L 63/0876* (2013.01); *H04L 63/0272* (2013.01)
(58) Field of Classification Search
  USPC .................................................. 709/7; 726/7
  See application file for complete search history.

(56) References Cited

U.S. PATENT DOCUMENTS

| 2001/0027528 | A1* | 10/2001 | Pirkey et al. ................... 713/202 |
| 2001/0037288 | A1* | 11/2001 | Bennett et al. ................... 705/38 |
| 2003/0139910 | A1* | 7/2003 | Yamamoto et al. ........... 702/188 |
| 2004/0254851 | A1* | 12/2004 | Himeno et al. ................. 705/26 |
| 2006/0069782 | A1* | 3/2006 | Manning et al. .............. 709/227 |

FOREIGN PATENT DOCUMENTS

| EP | 1 361 723 | 11/2003 |
| EP | 1361723 B1 * | 6/2008 |
| JP | 2003186838 | 7/2003 |
| JP | 2003216581 | 7/2003 |
| JP | 2003280970 | 10/2003 |
| JP | 2004070733 | 3/2004 |
| JP | 2004282731 | 10/2004 |
| JP | 2005004248 | 6/2005 |
| JP | 2005191973 | 7/2005 |
| JP | 2005327189 | 11/2005 |
| WO | WO-2006015253 | 1/2006 |

* cited by examiner

*Primary Examiner* — William Goodchild
(74) *Attorney, Agent, or Firm* — Hewlett-Packard Patent Department

(57) ABSTRACT

According to one embodiment of the present invention, there is provided a method of authorizing a computing device to access a network, comprising receiving authentication data including a user identifier from the computing device, determining whether approval to verify the authentication data is given, and where it is so determined, authorizing the device to access the network upon verification of the authentication data.

16 Claims, 3 Drawing Sheets

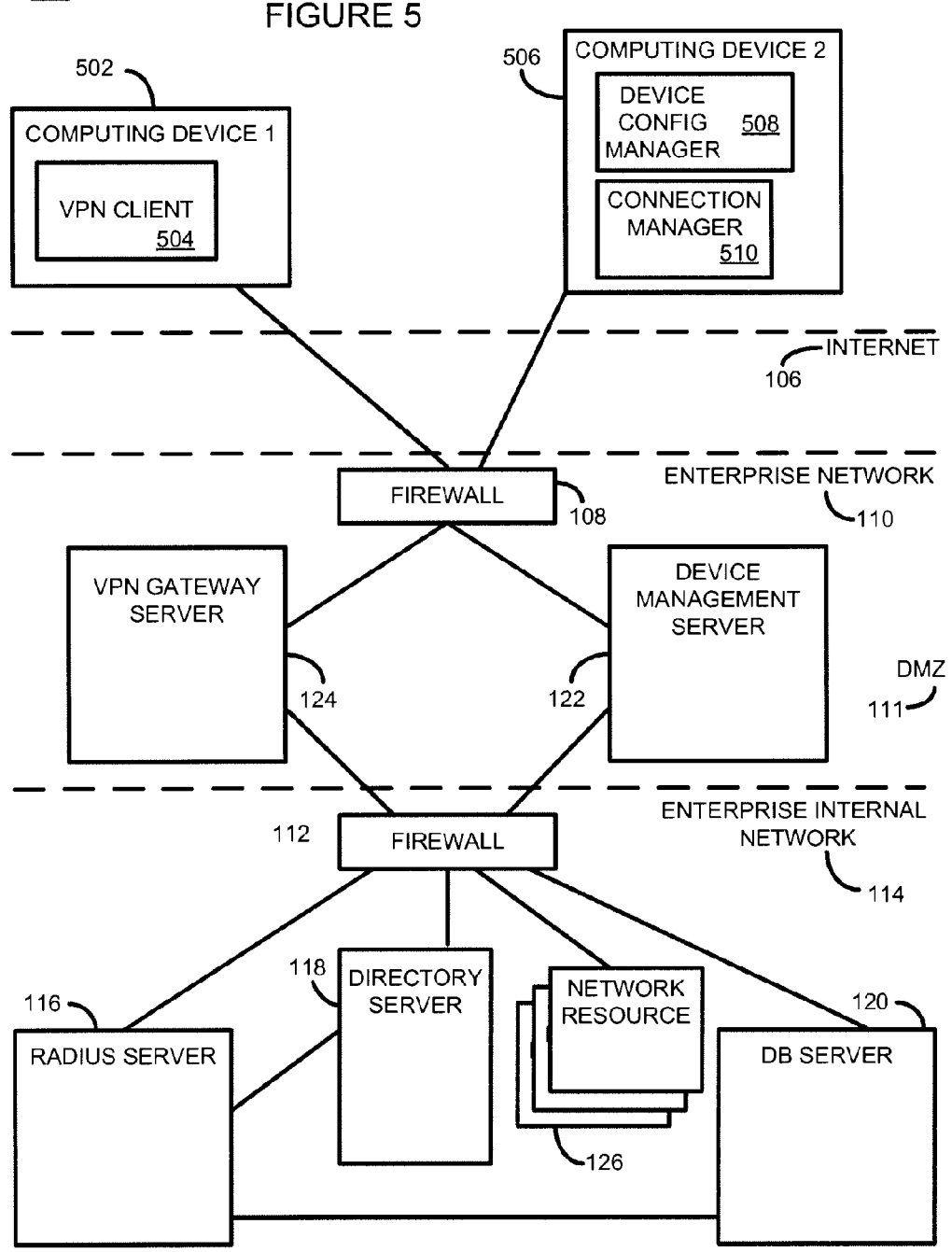

METHOD AND APPARATUS FOR ACCESSING A NETWORK

This application claims priority from European Patent Application 07301555.4, filed on Nov. 16, 2007. The entire content of the aforementioned application is incorporated herein by reference.

FIELD OF THE INVENTION

The present invention relates generally to a method and apparatus for accessing a computer network.

BACKGROUND OF THE INVENTION

It is known to allow computing devices to remotely connect to an enterprise or other private computer network over the public Internet. In order to control who has access to enterprise networks, IT managers use a variety of security policies and systems to help prevent unauthorised users from remotely accessing their computer networks.

Remote users are generally only allowed to remotely access an enterprise network upon successful completion of an appropriate user authentication procedure. Dual-factor authentication is largely considered by administrators of IT networks to be able to authenticate a user to a reasonable level of certitude. Dual-factor authentication is generally based on the key concepts of 'something I have', (such as a smart card or hardware token generator) and 'something I know' (such as a password).

Remote connections to enterprise networks are typically made over a secure virtual private network (VPN) to ensure that communications between the user's device and the enterprise network are suitably secured, for example through use of appropriate encryption techniques, although other access techniques, such as using HTTPS may be used.

To connect a computing device to a remote network via a VPN, the user of the computing device typically has a hardware or software token generator ('something I have') which, in response to a correct password ('something I know') being given, generates an authorisation token. Some token generators are arranged to receive a PIN protected smart-card containing cryptographic data used in the generation of the authorisation token. In this case, the smart-card can be considered a 'something I have' factor. The generated authorisation token is sent to a network based authentication system that determines that the user has been authenticated.

Although dual or multi-factor authentication techniques provide a strong level of user authentication, they are somewhat inconvenient for users. For instance, users may have to separately carry with them a hardware token generator, a smart card, or both depending on particular configurations. Furthermore, connecting through a VPN typically requires a number of independent steps that must be carried out in the correct order. For instance, a user may have to first unlock their computer using their an operating system username and password, to insert their smart card into their token generator, to enter a password into the token generator, to open their VPN client application, and to manually enter the generated authentication token to the VPN client application.

Accordingly, one aim of the present invention is to overcome, or at least to alleviate, at least some of the above-mentioned problems.

SUMMARY OF THE INVENTION

According to a first aspect of the present invention, there is provided a method of authorising a computing device to access a network. The method comprises receiving authentication data including a user identifier from the computing device, determining whether approval to verify the authentication data is given, and where it is so determined, authorising the device to access the network upon verification of the authentication data.

According to a second aspect of the present invention, there is provided a method, in a computing device, for accessing a remote network. The method comprises obtaining a predetermined set of parameters relating to characteristics of the device, sending the collected parameters to a first server, and sending authentication data to a second server.

According to a third aspect of the present invention, there is provided an authentication server operable in accordance with at least some of the above method steps.

According to a fourth aspect of the present invention, there is provided a computing device operable in accordance with at least some of the above method steps.

BRIEF DESCRIPTION OF THE DRAWINGS

Embodiments of the present invention will now be described, by way of non-limiting example only, with reference to the accompanying drawings, in which:

FIG. 5 is a block diagram of a system 500 according to an embodiment of the present invention.

DETAILED DESCRIPTION

Figure 1:
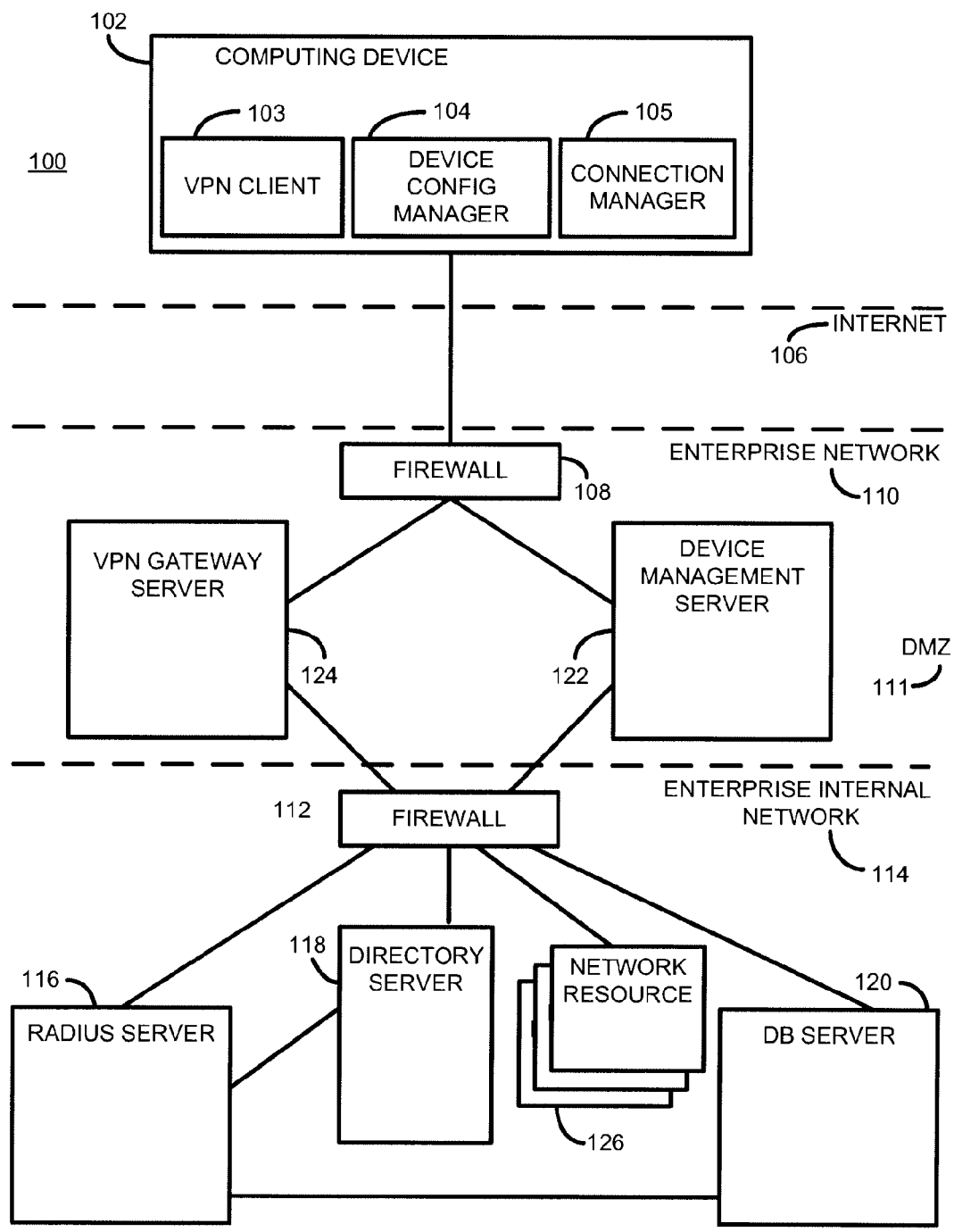
FIG. 1 is a block diagram of a system 100 according to an embodiment of the present invention.

FIG. 1 shows a simplified block diagram of a system 100 according to an embodiment of the present invention. Those skilled in the art will appreciate that, for clarity, not all elements of a typical network are shown.

A computing device 102, such as a suitably equipped personal computer, portable computer, personal digital assistant (PDA), mobile telephone, or the like, connects to the public Internet 106 in an appropriate manner. The connection to the Internet is made through an Internet service provider (not shown) with the connection to the ISP being made in any appropriate manner, for example through a DSL connection, a wireless LAN connection, a GSM-based GPRS data connection, etc.

The enterprise network 110 comprises, amongst other elements, a remote authentication dial in user server (RADIUS) 116, a directory server 118, a database server 120, a VPN gateway server 124 and a device management server 122. The enterprise network 110 is configured with a pair of firewalls, 108 and 112, to form a so-called demilitarised zone (DMZ) 111 and a secure enterprise internal network 114. In the DMZ 111 is arranged the device management server 122 and the VPN gateway server 124 which are both accessible directly through the Internet 106.

As will be well appreciated by those skilled in the art, network resources in the DMZ 111 may be directly accessible through the Internet, whereas network resources in the enterprise internal network 114 will typically only be accessible to a remote user following successful authentication.

Once the computing device 102 is connected to the Internet 106 it may, subject to the user of the device being suitably authenticated, remotely connect to the enterprise internal network 114 and thereafter access network resources 126 of the enterprise internal network 114.

In the present embodiment the computing device 102 hosts a VPN client application 103, a device configuration manager application 104, and a connection manager application 105.

The device configuration manager 104 is a software application operable for collecting one or more predetermined parameters from the computing device 102. The term parameter used herein will be understood to refer to either the parameter itself, the value of the parameter, or both, as appropriate. The predetermined parameters may relate to the physical computing device itself, such as unique hardware identifier (such as an international mobile equipment identity or IMEI, where the device is a mobile telephone), a hardware serial number, media access controller (MAC) address, and the like.

The predetermined parameters may also relate to one or more software components on the computing device 102, such as a unique identifier (such as a UUID) of the device configuration manager application 104, details of other software applications running or installed on the computing device 102 including, for example, their names, UUIDs, version numbers, etc., as appropriate.

Depending on the level of security required by the administrator of the enterprise internal network 114 the predetermined parameters arranged to be collected by the device configuration manager 104, and the number thereof to be collected may be modified.

In the present embodiment, the computing device 102 is suitably a combined personal digital assistant and mobile telephone having an IMEI.

As part of an initial configuration process performed on the computing device 102 by the administrator of the enterprise network, or later as appropriate, the administrator of the enterprise network 110 obtains, for example through the configuration manager 104, one or more parameters from the computing device 102. The obtained parameters are associated, by the network administrator, with a username, or other appropriate user identifier, given to the designated user of the device. Typically the designated user will be the sole intended user of the device. The username may, for example, be a network username. During the initial configuration process a UUID may be assigned to the device configuration manager 104.

The obtained parameters and username are stored in a database server 120 in such a way that the username may be retrieved by searching the database using one or more of the parameters as search keys.

In the present embodiment the device configuration manager is arranged to collect the IMEI of the computing device 102 and the UUID of the device configuration manager application 104.

Table 1 below shows the information stored in the database server 120 that was obtained, for example, when the computing device 102 was configured by the administrator of the enterprise internal network 114.

TABLE 1

| | |
|---|---|
| USER ID | vgiles |
| IMEI | 35-209900-176148-1 |
| UUID | 550e8400-e29b-41d4-a716-446655440000 |

Figure 2:
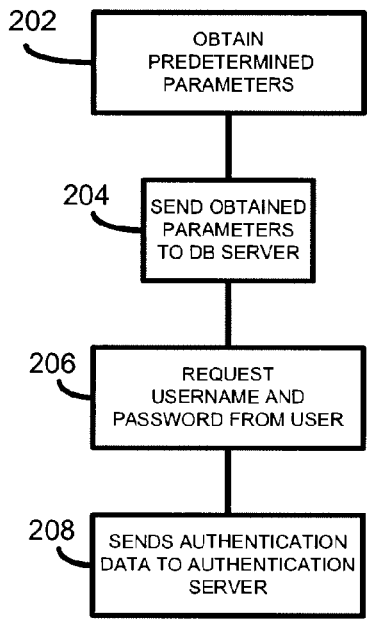
FIG. 2 is a flow diagram outlining example processing steps taken by a computing device according to an embodiment of the present invention.
Figure 3:
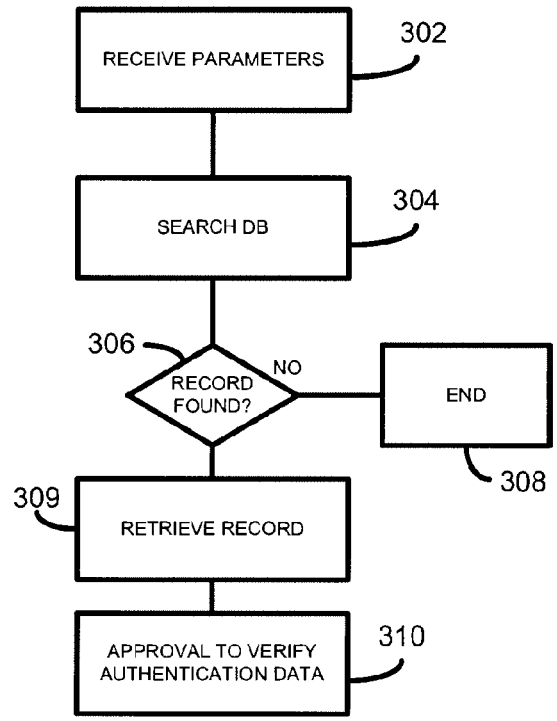
FIG. 3 is a flow diagram outlining example processing steps taken by a database server according to an embodiment of the present invention.
Figure 4:
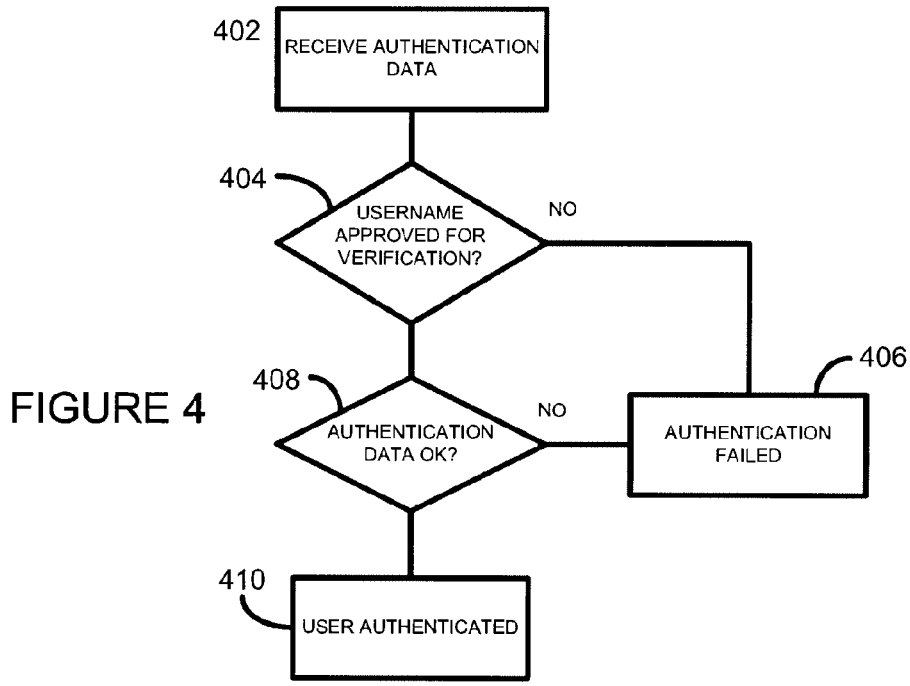
FIG. 4 is a flow diagram outline example processing steps taken by an authentication server according to an embodiment of the present invention.

The connection manager application 105 is a software application that facilitates the task of connecting the computing device 102 to the enterprise internal network 114. The manner in which the computing device 102 connects to the enterprise internal network 114 will now be described with additional reference to FIGS. 2, 3 and 4.

The user activates the connection manager 105 in any appropriate manner, such as by 'double-clicking' a connection manager icon. Upon activation, the connection manager 105 verifies whether the computing device 102 is currently connected to the Internet. If no Internet connection is detected the connection manager 105 may attempt to establish a connection to the Internet 106 in any suitable manner, such as through a wireless LAN connection point, or may otherwise instruct the user of the computing device 102 how to connect the computing device 102 to the Internet.

Once an Internet connection has been confirmed, the connection manager obtains the predetermined parameters from the configuration manager 104 (step 202). The parameters may, for example, be collected by the configuration manager 104 upon request by the connection manager 105, or alternatively the parameters may be collected when the device 102 is started, periodically, or at any other appropriate time, and stored for later retrieval.

At step 204, the connection manager 105 sends the obtained parameters to the device management server 122. The parameters may be sent to the device management server 122 in any suitable manner, such as using HTTP or HTTPS. In a further embodiment the device management server 122 may require the user of the device to provide a suitably matching username and password prior to the sending the obtained parameters.

After the connection manager 105 has sent the parameters to the device management server 122 it launches the VPN client application 103 that establishes a connection with the VPN gateway server 124. The VPN gateway server 124 requests, via the VPN client application 103, the user of the device to enter some authentication data which is then sent to the RADIUS server 116 through the VPN gateway server 124. The authentication data may include, for example, the user's network username, associated password, access code, or the like.

When the device management server 122 receives the parameters (step 302), it performs a search (step 304) of the database server 120 using one or more of the received parameters as search keys. In the present embodiment, for example, only the UUID parameter received at step 302 is used as a search key to search (step 306) the database server 120. If no database record containing that UUID is found, no further action is taken (step 308). If a database record is found, the database record is retrieved (step 309) and the username is extracted therefrom. At step 310 an approval to verify the authentication data associated with the extracted username is given, as described in further detail below.

In a further embodiment, an approval to verify the authentication data is only given if one or more of the parameters received at step 302 match the corresponding parameter values in the retrieved database record. For example, an additional check may be made to determine whether the IMEI of the computing device 102 that sent the parameters is the same as that used when the database record was created. In this way the administrator of the enterprise internal network 114 can further limit access to the network 114, for example, to a computing device paired to a user by requiring that a given user only accesses the network when using a given device.

Approval to verify the authentication data may be signalled in a number of ways. For example, in one embodiment, if approval is given at step 310, details of the extracted username are sent to the RADIUS server 116. In an alternative embodiment, a flag indicating that approval is given for the extracted username is stored in the corresponding database record of the extracted username in the database server 120.

When the RADIUS server 116 receives (step 402) the authentication data sent at step 208 a check is made (step 404) to determine whether approval to verify the authentication data has been given in step 310. In the embodiment where the approval was given by sending the approved username to the RADIUS server 116, a check is made to determine whether the username received with the authentication data at step 402 is the same as the username received from the device management server 122. In the embodiment where the approval was given by setting a flag in the database server 120, the RADUIS server searches the database server 120 using the username received at step 402 to determine whether the flag for approval has been set. If it is determined (step 404) that no approval to verify the authentication data has been given for the username received at step 402, authentication of the username is deemed failed (step 406) and no further action is taken.

If, however, it is determined that approval to verify the authentication data has been given (step 404), the RADIUS server requests the directory server 118 to verify (step 408) the authentication data received at step 402. Verification of the authentication data may be performed in any appropriate manner, such as, for example, checking whether the received username and password match a username and password stored in the directory server 118. If the directory server indicates that the received authentication data is not authenticated, the RADIUS server 116 rejects the authentication attempt (step 406). If, on the other hand, the directory server 118 confirms that the authentication data is authenticated (step 408) the computing device 102 is authorised to access network resources 126 on the enterprise internal network 114 as defined in the directory server 118. The RADIUS server 116 authenticates the user of the computing device 102 and allows the computing device 102 to access the enterprise internal network 114 in any appropriate manner, as will be well understood by those skilled in the art.

In further embodiments the check at step 404 may be augmented by the addition of a time check, so that verification of the authentication data is only performed if the approval to verify the authentication data was given within a predetermined time period. Such a time-based check may be made, for example, by recording timestamp data along with the approval to verify the authentication data and for calculating the time elapsed since the timestamp data was recorded.

The predetermined timeout period may be set to any suitable value to give a suitable time window within which the user of the computing device 102 has to provide their username and password once the predetermined parameters have been supplied to the device management server 122. The time period may, for example, be suitably set between 30 and 60 seconds. Where more enhanced security is required the time period may be set lower, or where more relaxed security is permissible the time period may be set higher.

In a yet further embodiment, the device management server 122 is connected to a suitable voice application accessible from, for example, a public switched telephone network (PSTN) or a public land mobile network (PLMN), or over a data network such as a voice over IP (VOIP) call. As part of the previously mentioned initial configuration process, or later as appropriate, an identifier suitable for identifying either the user of the computing device 102 or the user thereof is stored in the database server 120 along with the assigned username of the user. The identity may be, for example, a calling line identity number (CLIN) of the computing device 102, an international mobile subscriber identity (IMSI), a SIP URI, or the like.

The voice application is arranged to obtain the appropriate identity of a caller when a call is made thereto. In this embodiment, prior to the computing device 102 connecting to the RADIUS server 116 the user calls the telephone number associated with the voice application. The voice application obtains the appropriate caller identity associated and passes it to the device management server 122. The device management server 122 uses the obtained identity as the search key to obtain a username from the database server 120, in the manner described above. Upon the voice application hanging up the call, the user enters their username and password through the connection manager which is sent to the RADIUS server 116 in the manner described above. The RADIUS server 116 may then authenticate the user in the manner previously described.

The computing device 102 may be able to receive and install remote updates, such as software application updates or firmware updates, from the enterprise internal network 114, for instance as part of a managed IT service. In this case, details of any updates successfully completed on the computing device 102 are also recorded in the database server so that for subsequent authentication attempts the parameters obtained by the device configuration manager 104 are synchronised with those in the database server 120.

Those skilled in the art will appreciate that the functionality of the device management server 122 may be co-located with the RADIUS server 116.

It should further be noted that where the computing device 102 is or functions as a mobile telephone, the enterprise internal network 114 may be independent from the mobile telephony network service provider's network.

In a further alternative embodiment, the computing device may directly connect to the network 114, i.e. without use of a VPN, through the firewall 112 using a secure communication protocol, such as HTTPS. Upon the initial connection to the firewall 112, the firewall is configured to authenticate the user through the RADIUS sever 116. The RADIUS sever 116 is operable to authenticate the user in the manner described above.

Referring now to FIG. 5, there is shown a block diagram of a system of a still further embodiment of the present invention. The system of FIG. 5 has elements in common with the system of FIG. 1, and like references indicate like elements. In this embodiment the user has a first computing device 502, such as a portable or desktop computer, through which access to the enterprise internal network 114 is made. The user also has a second computing device 506, such as a portable digital assistant, smart-phone, or the like. When the user wishes to access the enterprise internal network 114 through the first computing device 502 the user first activates a connection manager 510 on the second communication device 506. As described above, the connection manager obtains parameters of the second computing device 506 from a device configuration manager 508, and sends those parameters to the device management server 122. Once the parameters have been sent from the second computing device 506, the user may activate a VPN client application 504, for example through a connection manager (not shown), that requests the username and password of the user. Authentication of the user occurs in the same manner as that previously described. The parameters initially stored in the database server 120 upon configuration of the first and second computing devices 502 and 506 are suitably those of the second computing device 506 and are associated with the username of the user in previously described manner. In this way, the authentication data sent during the authentication process comes from a device other than the computing device requesting access to the network.

As will be apparent from the above-described embodiments, embodiments of the present invention enable a user of a computing device to connect remotely to an enterprise internal network in a simple and secure manner and in a way which is advantageous to both the user and the administrator of the enterprise network 114. The access method is simple as it requires, in its simplest form, the user to simply invoke the connection manager application 105 and to provide their usual username and password when requested. The user requires no additional or separate smartcard or hardware or software token generator.

The network administrator is satisfied as a dual-factor authentication is used to authenticate users to access the network. The 'what I know' factor being provided by the user's password, the 'what I have' factor being properties of the computing device 102, provided by the one or more parameters collected and sent by the connection manager 105. Furthermore, security may be enhanced over a single 'what I have' factor when the device configuration manager is configured to obtain multiple parameters of the computing device 102.

Considerable cost savings can also be achieved by not requiring separate hardware token generators or smart cards to be issued to each remote user.

A further advantage is that the verification of the dual authentication factors, the 'what I have' and 'what I know' factors, is performed in the secure enterprise internal network, rather than locally on the computing device 102 as in conventional dual-factor authentication procedures. This helps further enhance security as it further removes the risk that the verification mechanisms on the computing device 102 can be compromised.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

The invention claimed is:

1. A method of allowing a computing device to access a network, comprising:
   receiving parameters including an identifier of the computing device;
   retrieving, from a database, information using at least one of the received parameters as a search key;
   giving approval to verify authentication data by matching the identifier of the computing device received as part of network connection establishment to a corresponding identifier in the retrieved information;
   receiving, by a server computer, the authentication data including a user identifier from the computing device;
   determining, by the server computer, whether the approval to verify the authentication data is given; and
   in response to determining that the approval is given, the server computer authorizing the computing device to access the network upon verification of the authentication data, wherein the verification of the authentication data includes comparing the user identifier in the authentication data with a user identifier from another source.

2. The method of claim 1, wherein the parameters are received from either the computing device or a different computing device.

3. The method of claim 1, wherein the authorizing is performed only where it is determined that the received authentication data was received within a predetermined period of the approval to verify being given.

4. The method of claim 1, where the received parameters include a unique identifier of an application in the computing device.

5. The method of claim 1, wherein the parameters are received at a first server accessible through a public Internet, and the authentication data is received at the server computer in a private network.

6. The method of claim 1, wherein the corresponding identifier retrieved from the database was saved in the database as part of a configuration process associated with the computing device.

7. The method of claim 1, wherein the identifier of the computing device is an international mobile equipment identity (IMEI).

8. The method of claim 1, wherein the identifier of the computing device is a hardware serial number of the computing device.

9. The method of claim 1, wherein the server computer includes a plurality of servers.

10. A non-transitory computer-readable storage medium storing one or more programs that upon execution by a computing device cause the computing device to:
   as part of a process to connect to a network, collect parameters including an identifier of the computing device and a user identifier associated with a user of the computing device;
   send the identifier of the computing device and the user identifier to a first server to cause the first server to provide approval based on matching the identifier of the computing device to information in a database record previously saved as part of a configuration process for the computing device, wherein the user identifier sent to the first server is useable by the first server as a search key to retrieve the database record;
   send authentication data to a second server; and
   receive an indication of authentication of the computing device based on the second server causing the authentication to be performed using the authentication data in response to the second server detecting that the approval is provided by the first server.

11. The computer-readable storage medium of claim 10, wherein the identifier of the computing device is an international mobile equipment identity.

12. The computer-readable storage medium of claim 10, wherein receiving the indication of the authentication comprises receiving the indication of the authentication that is performed based on determining that the authentication data was received by the second server within a predetermined time period of the approval being provided by the first server.

13. The computer-readable storage medium of claim 10, wherein the identifier of the computing device is a hardware serial number of the computing device.

14. A first server comprising:
- a non-transitory computer-readable storage medium storing one or more programs that upon execution cause the first server to:
  - receive parameters of a computing device as part of a process to connect the computing device to a network, wherein the parameters include an identifier of the computing device and a second identifier;
  - retrieve a database record from a database using the second identifier as a search key into the database;
  - match the identifier of the computing device to information in the retrieved database record;
  - provide an approval based on the match, the approval to enable performing authentication of the computing device based on authentication data from the computing device; and
  - send the approval to a second server to enable the second sever to perform the authentication based on the authentication data.

15. The first server of claim 14, wherein the sending of the approval to the second server causes the second server to perform the authentication based on determining that the authentication data was received by the second server within a predetermined time period of the approval being provided by the first server.

16. The first server of claim 14, wherein the identifier of the computing device includes one of an international mobile equipment identify (IMEI) and a hardware serial number of the computing device.

* * * * *

UNITED STATES PATENT AND TRADEMARK OFFICE
CERTIFICATE OF CORRECTION

PATENT NO.       : 9,143,494 B2                                   Page 1 of 1
APPLICATION NO.  : 12/271581
DATED            : September 22, 2015
INVENTOR(S)      : Vincent Giles et al.

It is certified that error appears in the above-identified patent and that said Letters Patent is hereby corrected as shown below:

In the claims

In column 9, line 21, in Claim 14, delete "sever" and insert -- server --, therefor.

Signed and Sealed this
Twenty-third Day of February, 2016

Michelle K. Lee
*Director of the United States Patent and Trademark Office*